Feb. 10, 1942. H. A. WEINLICH 2,272,450
TABULATING MACHINE
Filed Nov. 12, 1931 6 Sheets-Sheet 1

Feb. 10, 1942.     H. A. WEINLICH     2,272,450
TABULATING MACHINE
Filed Nov. 12, 1931     6 Sheets-Sheet 3

FIG.1b.

Feb. 10, 1942. H. A. WEINLICH 2,272,450
TABULATING MACHINE
Filed Nov. 12, 1931 6 Sheets-Sheet 4

INVENTOR
H. A. Weinlich
BY
W. M. Wilson
ATTORNEY

Feb. 10, 1942.   H. A. WEINLICH   2,272,450
TABULATING MACHINE
Filed Nov. 12, 1931   6 Sheets-Sheet 6

FIG.7.

Patented Feb. 10, 1942

2,272,450

UNITED STATES PATENT OFFICE 2,272,450

TABULATING MACHINE

Hermann Adalbert Weinlich, Berlin-Charlottenburg, Germany, assignor, by mesne assignments, to International Business Machines Corporation, New York, N. Y., a corporation of New York Application November 12, 1931, Serial No. 574,531
In Germany November 14, 1930

5 Claims. (Cl. 235—61.7)

The present invention relates to accounting machines and more particularly machines of the record card controlled type.

The invention is directed to improvements in machines of the type shown and described in the application of Felix Thomas, Serial No. 676,237, filed November 22, 1923 (now Patent #2,147,067, granted February 14, 1939) with a view to widening the range of usefulness of machines of this type so that a greater number of problems may be solved thereby. One such problem which will serve to illustrate the invention is the computation of bank interest for stated periods. In the computation of interest over a specific period it is the practice to accumulate a sum of all daily balances for the period upon which multiplication by the interest rate per diem will result in the amount of interest for the period. A machine for computing the sum of such daily balances is shown and described in the application of George F. Daly, Serial No. 530,860, filed April 17, 1931 (now Patent #2,036,683, granted April 7, 1936). In such machine and in others performing the same type of operation it is customary to prepare a perforated record card for each transaction and where several transactions take place in one day, there will be a corresponding number of record cards prepared. Where no transactions take place for any day, there will be no record cards for that day.

In operation the cards are arranged in chronological order according to date and special cards inserted in those positions in which no transactions were had for that day. These cards are perforated with the date designation preferably in the form of consecutive calendar days so that before insertion in the tabulating machine the calendar period for which interest is to be computed will be represented by a card or group of cards for each day in the period. As the cards are fed through the machine, those groups of cards which are comprised of several daily transaction cards will be separately totalized and the total entered into another accumulator. After each day's total has been obtained, it is added to the balance of the preceding day, thus forming an accumulative or progressive balance of the successive days.

Where no transactions have taken place for a particular day in consequence of which the special card is inserted for that day, the previous day's balance will be added to itself since that day's balance not having been changed will be the same as the previous day's. Where the interest period extends over an appreciable length of time, it frequently happens that there are no transactions for a considerable number of days within that period which would necessitate the insertion of a corresponding number of special cards in order that the chronological sequence remains intact. As an example, where the interest is computed for a period of say 180 days, if no transactions had taken place for say 90 days, it would necessitate the inclusion of 90 special cards in the total number of cards to pass through the tabulator. This requires the special perforation of these cards in accordance with the days in the sequence which they are to represent and also the additional work imposed on the machine in order to pass these cards therethrough.

It is the purpose of the present invention to obviate the necessity for the insertion of these special cards and provision is made for automatically entering the daily balances into the progressive totalizer under control of switching devices which determine for which days there have been no transactions and cause repetition of the entry of the last daily balance. According to this arrangement for every inactive day the previous day's balance will be entered into the progressive totalizer so that where fifteen days in succession are inactive, the last previous balance will be entered fifteen times into the progressive totalizer for which it will be necessary to operate the transferring mechanism of the machine for fifteen successive cycles. This transferring mechanism, as will be further explained, causes the entry into the progressive totalizer of the amount standing on the totalizer which carries the daily balance. According to a modification of the invention, means are provided for obtaining this entry in six cycles by use of the successive addition type of multiplication, that is, the last balance may be entered five times and after the entering connections have been shifted one denomination order higher a single entry will enter ten times the daily balance, this being the equivalent of ten successive entries in the usual way.

In its preferred form the controlling mechanism for determining the number of times a daily balance is to be repeated comprises a pair of settable commutator devices one of which is positioned under control of the record cards to represent the particular day perforated upon a record card. The second device is set up under control of the totaling and transferring mechanism of the machine to successively represent the days of the interest period. A comparison is made between the two setup devices and as long as they are in agreement record cards will be successively analyzed, their data items summarized and entered into the progressive totalizer. Where several daily cards are lacking, the next succeeding date set up on one of the devices will represent the next step upon which transactions occurred. This setup will then disagree with the machine controlled setup, the difference in the setting being equal to the number of days intervening on which no transactions took place. The machine will thereupon perform a series of transferring operations to enter the last daily balance into the progressive accumulator, each transfer operation serving to advance the machine setup device one position, thus gradually approaching the setup upon the card controlled device. When the devices are again in agreement the next day's transaction will be summarized and the machine controlled accordingly.

Other objects and advantages will hereinafter be pointed out in the specification and claims and shown in the drawings which by way of exemplification show one embodiment of the invention.

In the drawings:

Fig. 1a is to be disposed directly below Fig. 1, and Fig. 1b to the left of Fig. 1a.

Before describing the mechanism whereby the daily balance totals are repeatedly entered into a progressive totalizer, a brief résumé will be given of the manner in which totals may be transferred from one accumulator of the machine to another which is more fully set forth in the copending application of Felix Thomas, Serial No. 676,237 (Patent #2,147,067).

Figure 1:
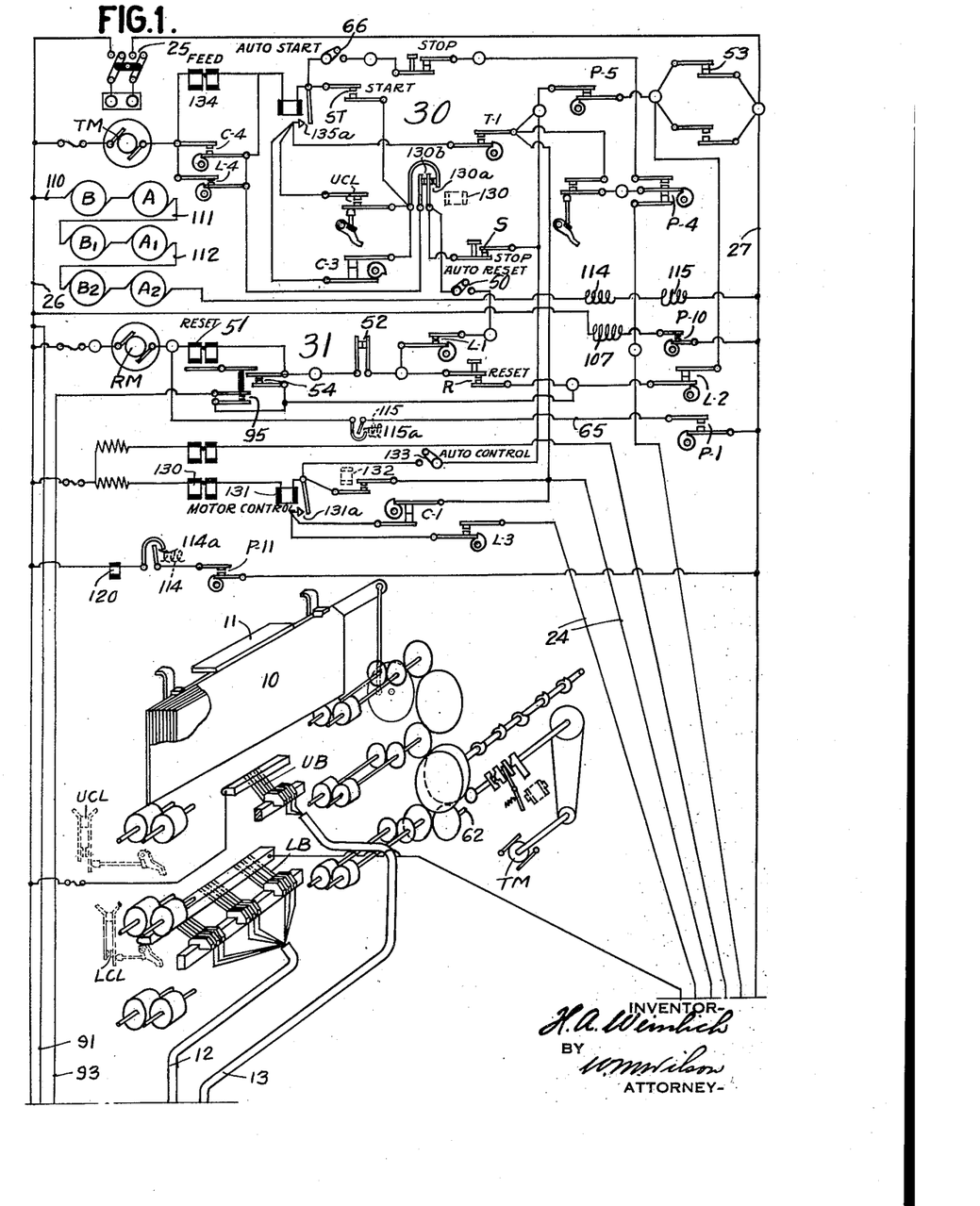
Figs. 1, 1a and 1b, taken together, show the complete wiring diagram of the electric circuit of the machine together with several of the mechanical features illustrated diagrammatically. In reading these drawings.
Figure 1A:
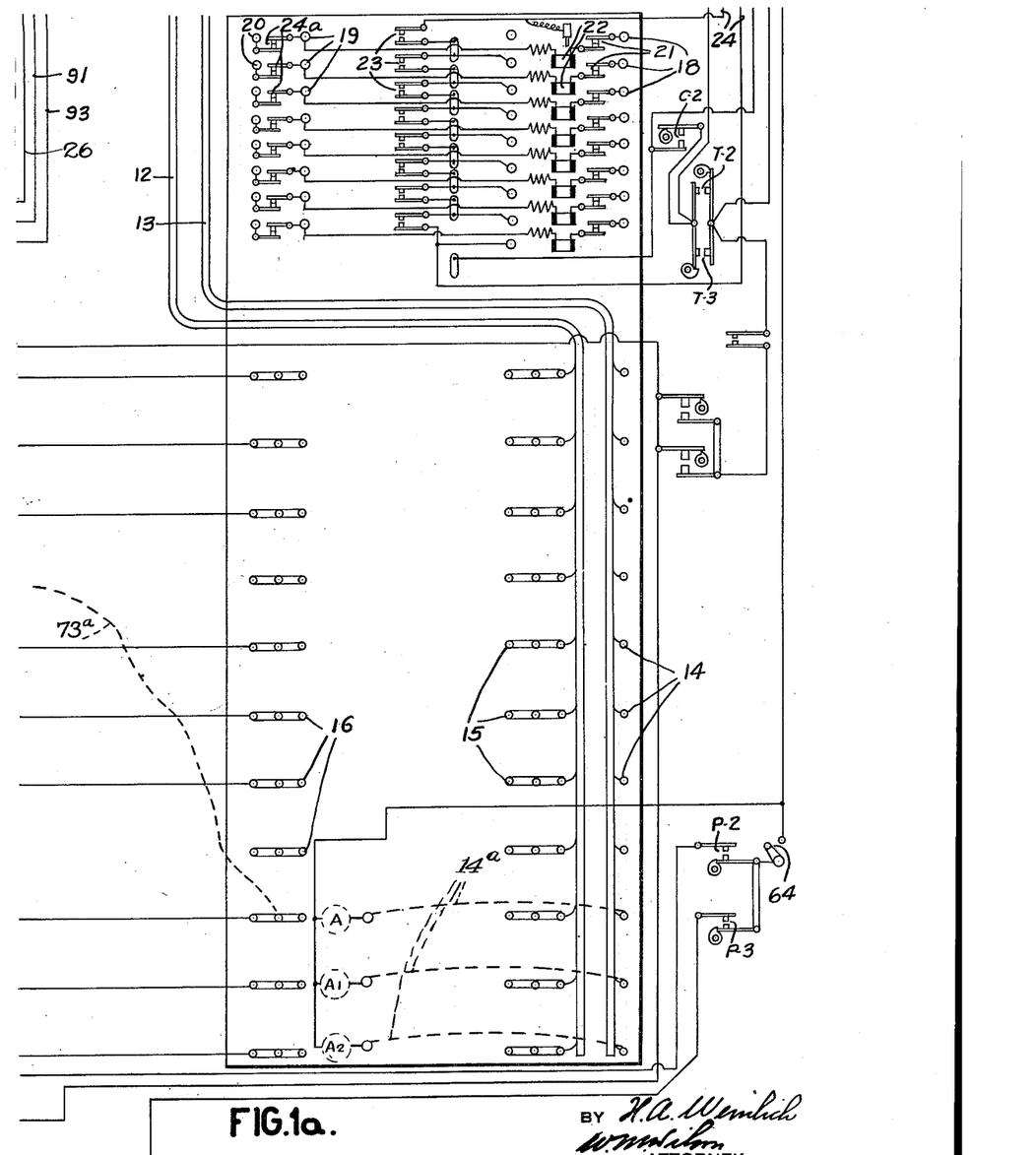
Figure 1B:
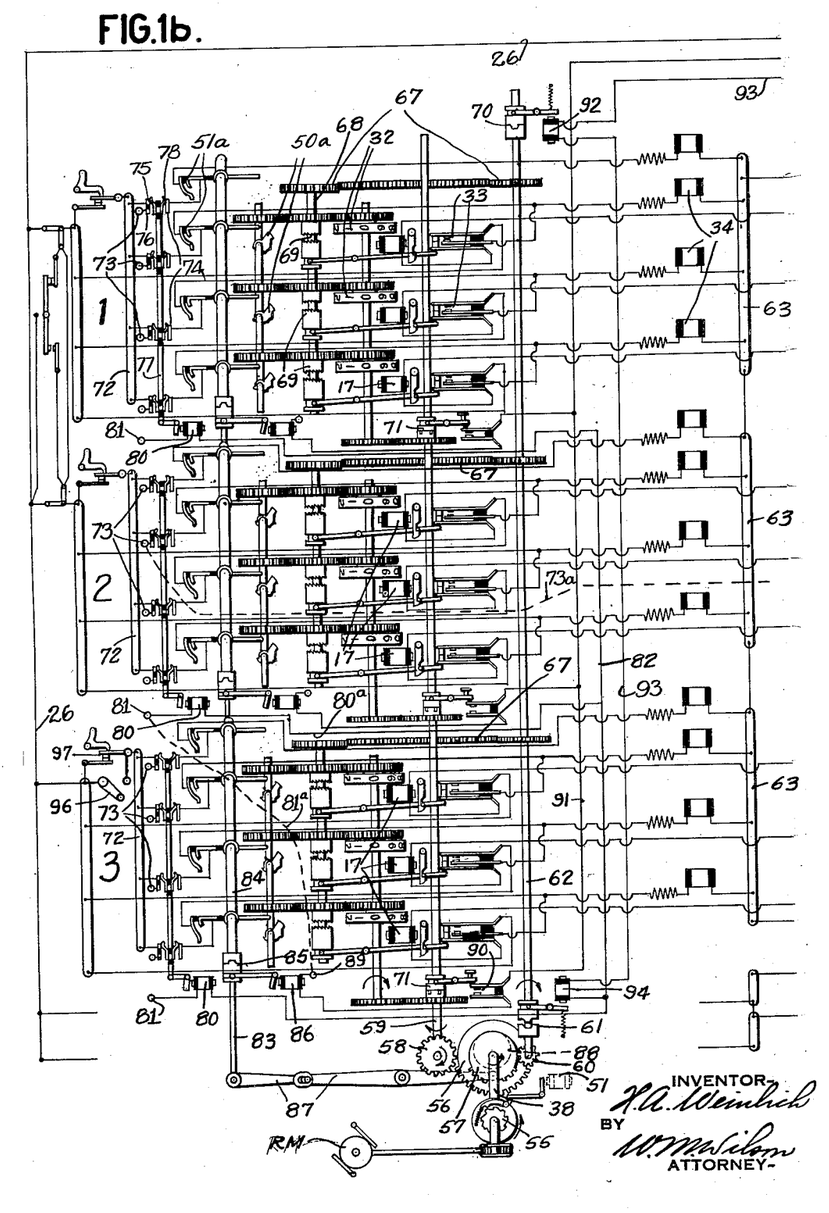

Referring to the diagrams of Figs. 1, 1a and 1b, the record cards are successively fed from a stacker 10 one at a time by means of a picker 11 into engagement with the usual feed rollers which advance them to the usual discharge stack. The cards are advanced past the upper analyzing brushes UB and exactly one machine cycle later past lower analyzing brushes LB. In the diagram only a few brushes are illustrated but it will be understood that the brushes may and usually do extend across the entire card so as to cooperate with any desired columns therein. Upper and lower card levers are provided to close contacts UCL and LCL respectively during passage of cards under the card levers. When cards are not under the levers the contacts are opened. Suitable wires are here shown cabled and indicated at 12 and 13 respectively and which respectively connect the lower and upper brushes with plug sockets on the tabulator plug board (Fig. 1a). These sockets are indicated at 14 and 15, the former for the upper brush positions and the latter for the lower brushes. The plug board also includes sockets 16 which are connected to the accumulator magnets 17 (Fig. 1b).

At the upper end of the plug board there is shown the circuit diagram of the automatic control and group indicator unit. When certain columns are to be used for automatic controlling plug connections are inserted between selected sockets 14 and sockets 18 of the automatic control unit. If straight controlling is being performed without group indicating, the connection is completed between plug sockets 19 and 15. On the other hand, if group indicating on any desired columns is required, connections may be made between the selected sockets 20 and plug sockets 16. On columns in which there is to be neither control nor group indicating but simply accumulator energization suitable plug connections are made directly between sockets 15 and 16.

The above description briefly indicates some of the principal plugging operations which may be employed, the effect of certain of which will be more particularly pointed out later in connection with a specific problem.

The so-called automatic control circuit between the upper and lower control circuits includes contacts 21 and magnets 22. The energization of magnets 22 is adapted to close corresponding contacts 23 to thereby establish the so-called control circuit 24 which extends serially through all the contacts 23. This circuit is established on each card cycle so long as the control perforations in two successive cards agree. Contacts 24a are the usual group indicator contacts which function to interrupt the accumulator circuit after the passage of the first card to suppress the adding in of further amounts upon the tabulating accumulator to which they are plug connected.

*General features of circuit diagram*

It may be explained that in tabulating machines of this type it is common to utilize cam contact devices for controlling certain circuit operations. For clarity in the circuit diagram all cam contact devices which are operated in unison and on common shafts are given similar reference numerals, for instance, a group of contacts marked P1, P2, P3 mounted on one shaft, another group marked C1, C2, C3, etc. on another shaft and so on.

All contact cams are insulated from each other and from the shaft upon which they are mounted. Current for the entire tabulator is supplied through a suitable source through switch 25 which when closed supplies current to the left side of line 26 and right side of line 27. During adding operations the machine is driven by a tabulating motor TM (Fig. 1) controlled by a group of cam and relay controlled circuits indicated at 30 and is driven during total taking operations by a reset motor RM controlled by a group of circuits, contacts, and relays designated generally at 31. When the tabulating motor TM is in operation it feeds the usual perforated tabulating cards bearing differentially arranged index points representing digits first beneath the upper analyzing brushes UB and exactly one machine cycle later beneath the lower analyzing brushes LB.

By means of the group control mechanism, groups of cards as represented by the same data entry in certain selected columns may be operated upon separately, the items of each group being accumulated and a total of them taken before the machine begins operation on the following card group. As the perforated cards pass the lower brushes their index points instantaneously close circuits through the proper lower analyzing brushes LB to energize accumulator magnets 17. As usual the timed energizations of these magnets control mechanism for entering the data corresponding to the card reading on the accumulator wheels 32 (see Fig. 1b). When any magnet 17 is energized it causes contacts 33 to close energizing a printer magnet 34 to select the type corresponding to the entered data for printing. In this fashion the accumulated items may be listed. These functions do not enter specifically into the present invention and will not be described in detail as they are well understood in the art.

Figures 2, 3, 4, 5:
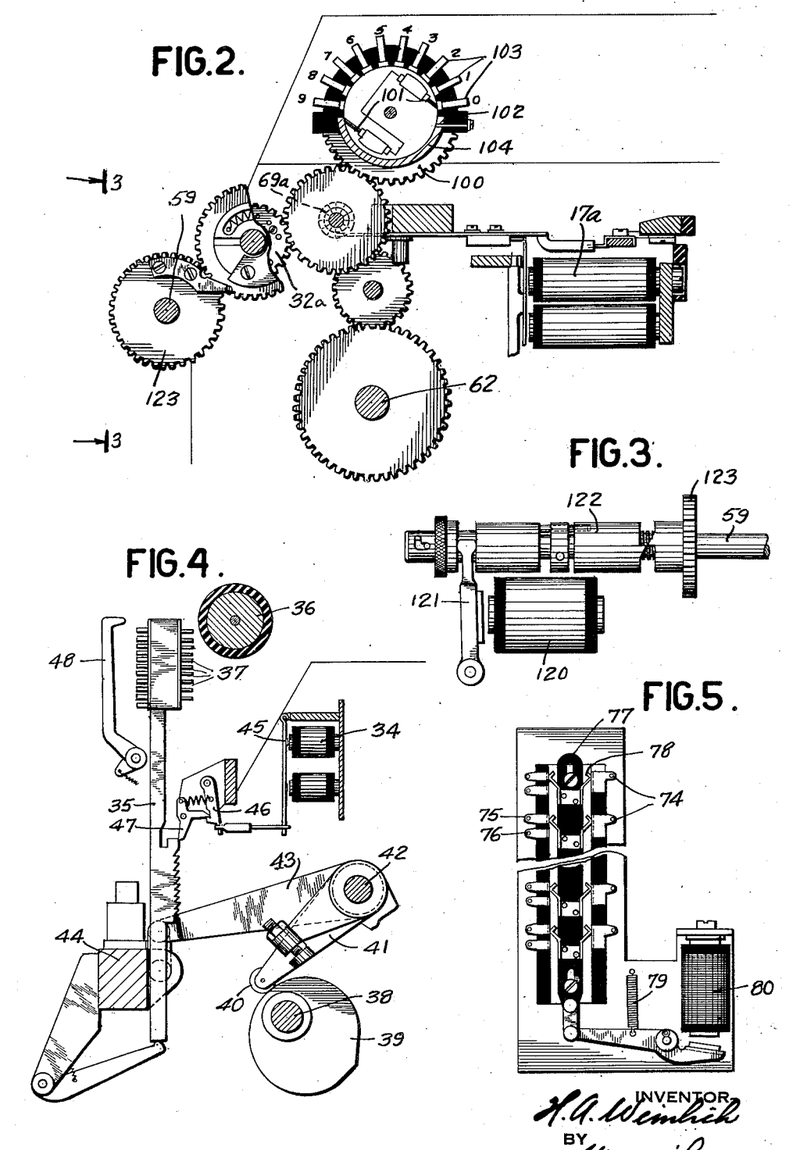
Fig. 2 is a sectional view of the card controlled date setup device.
Fig. 3 is a diagram of the restoring mechanism for the device in Fig. 2, the view being taken along the lines 3—3 of Fig. 2.
Fig. 4 is a detail view of the printing mechanism of the machine.
Fig. 5 is a detail of a circuit controlling switch.

In Fig. 4 is shown the printing mechanism through which the type bar 35 is positioned relatively to the platen 36 to bring the proper type 37 into printing position opposite the platen. The total shaft 38 driven by the reset motor RM is provided with a cam 39 cooperating with a roller 40 carried by an arm 41 operatively connected to a shaft 42.

As the cam rotates, shaft 42 is rocked in a clockwise direction and an arm 43 secured thereto and linked at its free end to printing crosshead 44 serves to raise the type bars 35 in synchronism with the total taking mechanism so that the type 37 successively pass printing position opposite platen 36. The type bar 35 is arrested under control of printing magnet 34 which when energized attracts its armature 45 and through a call wire releases latch member 46 normally holding stop pawl 47. When the pawl is so released it is spring-operated to engage the ratchet teeth formed on the type bar 35 to prevent further upward movement of the type bar thus holding a particular type 37 in printing position. The usual printing hammers 48 are provided to impel the type against the platen.

The total taking mechanism comprises the usual stepped cams 50a and contact devices 51a (Fig. 1b) which operate in synchronism with the printing mechanism during total taking operations to stop the type bars at a position corresponding to the setting of the stepped cams 50a.

The contact devices 51a for each counter are controlled individually for each accumulator and are adapted to be rocked into contact with the stepped cams 50a by means of a rock shaft 83. The contact devices are actuated by means of sleeves 84 which are coupled to the shaft by clutches 85, controlled by magnets 86. One clutch 85 and magnet 86 are provided for each different accumulator section 1—2—3, etc. Rocking of shaft 83 is secured by a linkage 87 which is actuated by a suitable cam 88 mounted on total shaft 38 which is driven by the reset motor RM during total printing operations and total transfer operations.

*Transferring, resetting and printing operations*

After the tabulation of the group is completed the resetting and printing of a total may be effected. This operation can be initiated manually or automatically. If automatic initiation is desired, switch 50 is first closed. The cam contacts L—1 then automatically close just as the tabulator comes to rest (but open before the tabulator is fully at rest) to establish a circuit to the resetting motor RM traced as follows: from left side of line 26, reset motor RM, reset clutch magnet 51, contacts 52 which are closed at all times when the card feed clutch magnet is deenergized, contacts L1, switch 50, stop key S, contacts P5 and 53 to the other side of the line 27. The energization of the reset clutch magnet 51 attracts its armature and closes contacts 54 which establish a holding circuit for the reset magnet 51 traced as follows: From reset clutch magnet 51, through contacts 54, thence through contacts L2 now closed, up to contact 53 and back to the right side of the line. While reset motor RM is rotating and reset magnet 51 energized, a suitable clutch member 55 (Fig. 1b) will couple the drive shaft from the reset motor RM to two gear disks 56, 57. The former gear 56 is effective only during the last half of the cycle due to the absence of teeth on half of its periphery and through a gear 58 rotates a reset shaft 59 and resets any accumulators which are selected for resetting to zero. Gear 57 is utilized for driving a gear 60 which through clutch 61 during total transferring operations, drives the main driving shaft 62 for the accumulators during resetting operations. Gear 57 drives gear 60 which through clutch 61 drives shaft 62. Prior to the resetting of the accumulators the printing of the total standing upon the accumulators or the group numbers thereon is effected. For effecting this printing the stepped cams 50a heretofore mentioned are utilized. During such printing operations cam contacts P2 and P3 shown in the lower part of the diagram (Fig. 1a) serve to supply current to the common bars 63 of the printer magnet sections. The common circuit from the right side of line to the cam contact devices P2 and P3 leads through a non-total printing switch 64, which, when opened, suppresses the printing of totals. The actual printing operation is controlled from the stepped cams 50a previously mentioned.

During resetting, total transferring and total printing operations, provision is made for preventing the starting up of the main tabulator control circuits until the transferring, printing and resetting is completed. This is effected through cam contacts P5 which interrupt the main circuit of the tabulator from the right side of line. The cam contacts P1 serve at the proper time in the resetting cycle to establish a circuit 65 to motor RM to shunt out the reset magnet 51. These contacts serve to maintain the reset motor RM in operation until the end of the reset cycle and upon being opened interrupt the resetting operation bringing the reset motor to rest. Just before the resetting operation is completed upper contacts P4 close. The closure of these contacts provided the automatic start switch 66 is previously closed establishes a circuit to restart the tabulating operation upon the next group. The purpose of this circuit is to permit the automatic starting of the tabulator if there are additional cards in the machine. If switch 66 is open, the tabulator is not started automatically but may be restarted by depressing start key ST. The automatic start-up contacts, namely, the upper of contacts P4 break immediately after the usual holding circuits are established for the operation of the tabulator, and at the time the P group of cams come to rest these upper contacts are open, as shown.

If automatic total printing and resetting is not desired, switch 50 may be opened and the initiation of resetting effected by the depression of the reset key R.

The shaft 62 is the main driving shaft of the tabulator. This shaft through suitable gearing generally designated 67 is adapted to drive the clutch shaft 68. The clutches 69 are of the form usually used in tabulating machines and through suitable gearing drive the accumulator wheels 32. During the normal operation of the tabulator when items are being accumulated or set up upon the accumulative accumulators in accordance with the perforations of passing record cards, the shaft 62 is driven from the tabulating motor (note Fig. 1), in which this shaft is shown projecting from one of the card feeding gears.

Disposed on the shaft 62 is a clutch 70 (Fig. 1b) which is adapted to clutch the tabulator motor to the main portion of the shaft 62 which drives the accumulators. When clutch 70 is disengaged this shaft 62 may be driven by the reset motor provided clutch 61 is engaged. It will be understood that drive from the reset motor is only effected when transfer of total operations is to take place.

Disposed upon reset shaft 59 are a number of clutch devices 71. These clutch devices are of the form usually used in tabulators and when disengaged are adapted to throw out the reset mechanism for the particular accumulator with which they are associated.

With the usual tabulator the circuit from the total control contacts 51a extends directly to common bars 72. When it is desired to transfer totals a suitable switch mechanism must be provided to break the circuit to the common bars 72 and to establish a circuit to plug positions 73. A separate switch device is employed for each accumulator. The details of this switch device are shown in Fig. 5. A suitable insulating block is slotted and provided at one side with wide contact lugs 74. These are directly connected to the controlling contacts 51a (see Fig. 1b). Multiple lugs 75 and 76 are provided at the opposite side of the block, the former connecting respectively to the common bars 72 and the latter being connected to the individual plug sockets 73. Disposed intermediate the contact blocks 74 and 75—76 is a slidable bar 77 carrying contact blades 78. The arrangement is such that with the slide 77 in upper position contact is established between 74 and 75. With the slide 77 in lower position contact is established between 74 and 76. The slide is normally maintained elevated by a spring 79 and is adapted to be lowered by energizing a magnet 80.

As shown in Fig. 1b there is one of these switch devices for each accumulator section. There are corresponding individual magnets 80 for each accumulator section. Magnets 80 are disposed in circuits which terminate at one end in plug sockets 81 and which, at the other end, extend to a line 82. The magnets 86 previously referred to are disposed in similar circuits terminating at one end at plug sockets 89 and extending through contact devices 90 to a line 91. The contact devices 90 are interlocked with the reset clutch devices 71 so as to be closed when these reset clutches are withdrawn to prevent the resetting of the accumulators.

Disposed in line 93 is a magnet 92, which, when energized, withdraws or disengages clutch 70. Disposed in a line 93, which, in effect, is a continuation of line 82, is a magnet 94, which, when energized, is adapted to engage clutch 61. Line 93 extends upwardly, as shown in Fig. 1, and connects to a pair of contacts 95, which contacts are adapted to be closed by the armature of the clutch magnet 51, when this magnet is energized.

Let it now be supposed that an amount is to be transferred from the No. 2 accumulator to the No. 3 accumulator. The operator by means of a suitable plug connection plugs up the plug sockets 73 of the No. 2 accumulator with the corresponding denominational order sockets 16 of the No. 3 counter by means of a connection such as 73a. Then a single plug connection 81a is placed between plug socket 81 of the No. 2 accumulator and the socket 89 of the No. 3 accumulator. This last mentioned plugging between 81 and 89, in effect, connects magnets 92, 94, 86 of the No. 3 accumulator, and 80 of the No. 2 counter in series, the circuit extending through the contacts 90 of accumulator No. 3 also. This circuit may be traced from line 26 (Fig. 1), wire 91, (Figs. 1a and 1b), contacts 90, magnet 86, plug connection 81a, magnet 80, wire 80a, wire 82, magnet 94, wire 93, magnet 92, wire 93 (Figs. 1a and 1), contacts 95, contacts L2, 53 to line 27. The reset clutch 71 of the No. 3 accumulator is then disengaged to thereby close contacts 90. The operator then presses the reset key R (Fig. 1) or if automatic total printing is desired the switch 50 will have been previously closed and resetting will be initiated automatically.

Just after the reset cycle starts contacts 95 (Fig. 1) will close to complete the circuit just traced. Magnet 92 will be energized disengaging clutch 70. Similarly magnet 94 will be energized engaging clutch 61. Shaft 62 will then at the proper time in the cycle, namely, the initial part thereof, be driven by the reset motor RM. While this shaft is in rotation the contact devices 51a of the No. 2 accumulator will take a reading of the stepped cams 50a. Circuits will be established through the printer magnets 34 of the No. 2 accumulator just as if an ordinary total was being printed. However, these circuits instead of extending directly to the common bars 72 and back to the left side of the line will flow through the plug connections 73a mentioned, to the multiple sockets 16, thence through the accumulator magnets 17 of the No. 3 accumulator and back in the usual manner to the left side of the line. In this way the magnets 17 of the No. 3 accumulator will be energized at varying times in the machine cycle and the amount standing on the No. 2 accumulator will be set up on the No. 3 accumulator.

Concurrently in the printing section of the machine the printer magnets 34 corresponding to the No. 2 accumulator will be energized and print the transferred total. If desired, there may be a printing of the transferred total on the No. 3 accumulator. To secure this result switch 96 of the No. 3 accumulator must have first been closed, otherwise the disengagement of the reset clutches 71 will have opened contacts 97, and prevented the printing. Ordinarily switches 97 would have been left opened and the transferred total would not have been printed on the record sheet which receives the records of the entries of the No. 3 accumulator. During this total transferring and printing operation the magnet 86 of the No. 3 accumulator has been energized thus disengaging clutch 85 and preventing the rocking of the sleeve 84 and the lowering of contacts 51a onto the stepped cams 50a of the No. 3 accumulator. If such contact devices 51a were not rendered inoperative at this time they would interfere with the movement of the stepped cams 50a as will be readily understood.

After the total transferring operation is completed contacts 95 (Fig. 1) will open and the machine will then be ready to tabulate in the usual manner from record cards entering items from the cards as desired.

It will be understood that the plug connections explained above can be placed intermediate any desired accumulators. For example, after the amount is transferred from the No. 2 to the No. 3 accumulator and further entries received on the No. 3 accumulator from the record cards, the plug connections can be inserted between sockets 73 of the No. 3 accumulator and sockets 16 of the No. 2 accumulator. Similarly the single plug connection could be inserted in the socket 89 of the No. 2 accumulator and in socket 81 of the No. 3 accumulator. If the total transfer operation is then repeated amounts can be transferred back from the No. 3 accumulator to the No. 2 accumulator. Similarly entries from any accumulator can be transferred to any other accumulator or vice versa, the mere re-plugging only being necessary to control the transfer of the total operation to the desired accumulator.

The contacts 90 heretofore referred to are in the nature of safety contacts and compel the withdrawal of the reset clutch 71 for any particular accumulator before entries can be transferred into it from any other accumulator. It is obvious that resetting should be suppressed upon the accumulator into which an entry is to be made, otherwise the amount would be first set up on the accumulator and then immediately removed therefrom by the resetting operation.

Having described the construction and operation of the machine to which the present invention may be applied, the particular details of the invention will now be described.

Referring to Fig. 2, a sectional view of one of the date setup devices is shown. The construction of this mechanism is similar to the usual accumulator construction having a record card controlled magnet 17a adapted when energized to trip the accumulator clutch 69a to establish a driving connection between the main tabulating shaft 62 and indicating wheel 32a. This clutch structure is identical with the counter clutch structure shown in more detail in Fig. 1b.

Figure 6:
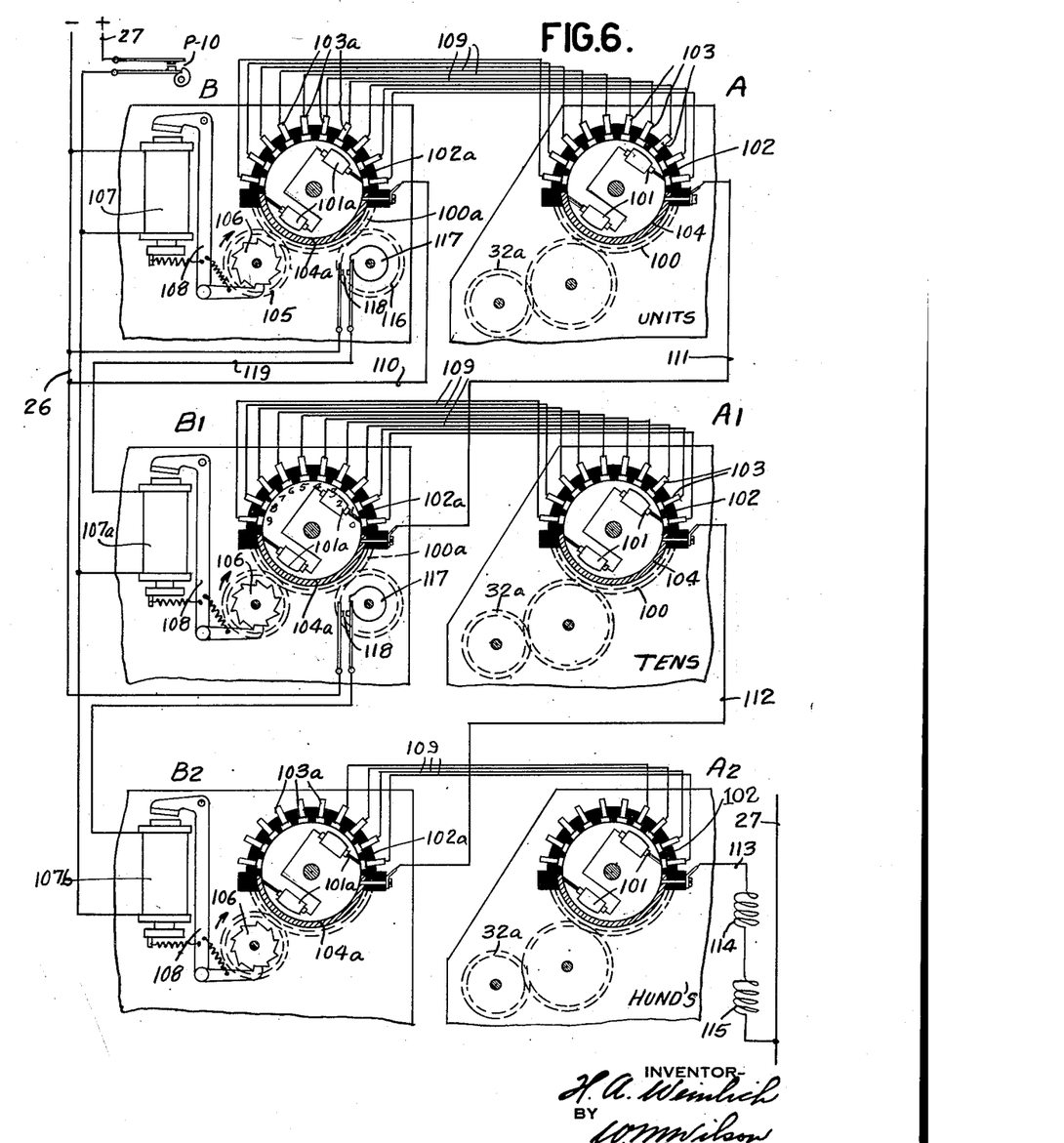
Fig. 6 is a detail circuit diagram of the date comparing devices.

A gear 100, driven by the gear which drives the indicating wheel 32a carries a pair of electrically connected brushes 101 insulated therefrom. Cooperating with the brushes is a commutator 102 provided with segments 103 corresponding in number and position to the several digit indicating positions of the indicating wheel 32a. The arrangement is such that the brushes 101 are angularly displaced according to the reading of the wheel 32a. One of the brushes cooperates with the segments 103 and the other engages a common segmental conductor 104 whose surface conforms to the configuration of the commutator 102. Thus where a particular number is entered upon wheel 32a, one of the brushes 101 will be in position to connect the corresponding segment 103 with the conductor 104. This device is adapted to receive the calendar day entry from the record cards. A similar set up device shown diagrammatically in Fig. 6 is provided to receive a setting under control of the totaling mechanism. This device comprises a commutator 102a having segments 103a which cooperate with a pair of brushes 101a mounted upon a gear 100a. Gear 100a in this instance has driving connection with a gear 105 to which is secured a ratchet 106. Rachet 106 is adapted to be advanced step-by-step under control of a magnet 107 which upon energization rocks its armature 108 to effect advance of the ratchet wheel. Each of the segments 103 is electrically connected by means of wires 109 to the corresponding segments 103a of commutator 102a.

In Fig. 6, three pairs of set up devices 102, 102a have been shown to provide for the control of the machine in accordance with the calendar days of the year. The card controlled setup devices have been designated generally A, A1 and A2 corresponding to the units, tens and hundreds positions respectively, and the machine-controlled setup devices have similarly been labelled B, B1, and B2.

Whenever the number set up on devices A, A1, A2 corresponds to the number set up on devices B, B1, B2, a series circuit will be completed through all of the commutators. In the case of a number as 267, the brushes of A and B will be set at 7, the brushes of A1, B1 will be set at 6, and the brushes of A2, B2 will be set at 2. With this setting a circuit may now be traced on the diagram of Fig. 6 from line 26, through a wire 110 to the conductor 104a of device B, thence through brushes 101a to the 7 segment 103a, through a wire 109 to the 7 segment 103 of device A, thence through brushes 101, conductor 104, to a wire 111 which connects with conductor 104a of the B1 device. The circuit will continue through brushes 101a of the B1 device, to the 6 segment, through a wire 109 to the 6 segment of the A1 device, its brush 101, and conductor 104 and thence through a wire 112 to the conductor 104a of the B2 device. In a similar manner the circuit will continue through the A2 device to a wire 113, thence through a pair of relay coils 114 and 115 to the other side of line 27.

It is thus apparent that whenever the two devices are similarly positioned, a circuit will be completed through the relay coils 114 and 115. The function of these relays will be explained later.

Magnet 107 receives an impulse during each operation of the totaling mechanism. A cam contact P10 is adapted to close momentarily once during each totaling operation to complete a circuit from line 27, contact P10, magnet 107, and back to line 26. This will advance the units set up device B one digit.

Meshing with gear 100a is a gear 116 which carries a cam 117 which is adapted to close a contact 118 whenever the brushes 101a are positioned at 9. With the B device so set the advancing impulse through contact P10 will branch through magnet 107a of the B1 device, wire 119, contact 118 of the B device, to line 26 causing the B1 or tens order to advance one step. The B1 device is also provided with a contact 118 which in a similar manner will control the tens transfer operation to the next highest order.

The devices shown in Fig. 6 are included in the diagram of Fig. 1 in simplified form.

In Fig. 3 is shown the resetting mechanism for zeroizing the device shown in Fig. 2. A magnet 120 when energized is adapted through its armature 121 to shift a clutching member 122 slidably keyed to reset shaft 59 into engagement with the resetting gear 123 of the card setup device. Magnet 120 is adapted to be energized during the last totaling or transferring operation of the machine preparatory to the tabulation of a new group of cards so that the device may be in position to be set in accordance with the data contained on the first card of the succeeding group.

Referring now to Fig. 1, relay coil 115 is adapted upon energization to close its normally open points 115a and coil 114 causes closure of its points 114a in the same manner. Points 115a are connected in series with the cam contacts P1 which as has been pointed out above close during each totaling and resetting operation to short-circuit the reset motor holding circuits to terminate the resetting operation. As long as relay points 115a remain open, this shunting circuit cannot be completed and the machine will continue performing totaling and transferring operations indefinitely. Relay points 114a are included in a circuit through magnet 120 and a pair of contacts P11 which close each total and reset cycle. With relay points 114a open the magnet 120 can, of course, not be energized.

The specific devices and circuits having now been particularly pointed out the operation of the entire machine will be reviewed with reference to a specific problem which will serve best to point out the coordination of the various elements. Assume that it is desired to compute the interest for a thirty day period during which deposits have been made in accordance with the following table:

*Table I*

| Deposits | Day |
|---|---|
| 25 | 1 |
| 167 | 2 |
| 86 | 3 |
| 120 | 17 |
| 52 | 18 |
| Blank | 30 |

This table represents a series of cards, one for each deposit. It will be noted that deposits were made on the days represented in the right hand column. Also no deposits were made between the third and the seventeenth, nor between the eighteenth and thirtieth, for which last day a blank card is inserted in the group for a purpose to be explained. The cards are arranged in chronological order according to day.

In the following table is shown a detailed tabulation of the type of report which may be prepared under control of this group of cards:

*Table II*

| Day | ACC #1 daily totals | ACC #2 daily balances | ACC #3 |
|---|---|---|---|
| 1 | 25 | 25 | 25 |
| 2 | 167 | 192 | 217 |
| 3 | 86 | 278 | 495 |
| 4 | | 278 | 773 |
| 5 | | 278 | 1,051 |
| 6 | | 278 | 1,329 |
| 7 | | 278 | 1,607 |
| 8 | | 278 | 1,885 |
| 9 | | 278 | 2,163 |
| 10 | | 278 | 2,441 |
| 11 | | 278 | 2,719 |
| 12 | | 278 | 2,997 |
| 13 | | 278 | 3,275 |
| 14 | | 278 | 3,553 |
| 15 | | 278 | 3,831 |
| 16 | | 278 | 4,119 |
| 17 | 120 | 398 | 4,517 |
| 18 | 52 | 450 | 4,967 |
| 19 | | 450 | 5,417 |
| 20 | | 450 | 5,867 |
| 21 | | 450 | 6,317 |
| 22 | | 450 | 6,767 |
| 23 | | 450 | 7,217 |
| 24 | | 450 | 7,667 |
| 25 | | 450 | 8,117 |
| 26 | | 450 | 8,567 |
| 27 | | 450 | 9,017 |
| 28 | | 450 | 9,467 |
| 29 | | 450 | 9,917 |
| 30 | | 450 | 10,367 |

The column headed Daily totals contains the balance of a particular's day transactions. The column headed Daily balances represents the progressive total of the several daily totals, while the last column represents the sum of the daily balances of the account. This column is not printed on the report sheet but is shown in connection with the report to indicate the operation of the machine. Above the report are indicated the accumulators which handle the amounts represented under such headings. Before proceeding with the tabulation of the cards, certain plug connections are to be made to cause entry of the amounts into the proper accumulators and also to secure the proper transferring operations.

The upper brushes UB which sense the field of the record cards in which the day is perforated are plug connected by plug connections 14a to the magnets 17a of the date setup devices A, A1 and A2. This same field is also associated with the automatic group control devices through plugging connections heretofore traced. The lower brushes which read the field of the card perforated in accordance with the deposits are plug connected to both accumulators No. 1 and No. 2. Accumulator No. 1 is arranged to total print and reset during totaling operations while accumulator No. 2 is arranged to total print without resetting for each totaling operation and at the same time transfer the amount contained therein into accumulator No. 3. Accumulator No. 3 is arranged to receive entries from accumulator No. 2 during totaling operations without resetting. The detailed plugging connections to effect these operations have been traced in detail above and need not be repeated here.

With the setup devices B, B1 and B2 set at 0, 0, 0, the group of cards is placed in the supply hopper. Preliminary operations are first effected to advance the first card to the sensing brushes and as usual before cards can be fed, the motor control relay magnet 130 (Fig. 1) must be energized. One way to do this is to close the auto-control switch 133 which energizes magnet 130 through a circuit from line 26, magnet 130, relay magnet 131, switch 133, contacts P—5 and 53 (both closed) to line 27. As a result, contacts 130a of magnet 130 are closed.

With the auto-start switch 66 and auto-reset switch 50 open, the operator closes start key contacts ST momentarily to complete a circuit from line 26, motor TM, feed clutch magnet 134, relay magnet 135, contacts ST, 130a, S, P—5 and 53 to line 27. The circuit is held through contacts 135a and T—1, which latter contacts open near the end of the cycle and the machine comes to rest with the first card advanced to the first pair of feed rollers. The operator again closes contacts ST to effect a second feed cycle near the end of which contacts T—1 again open to break the circuit before the leading edge of the card has closed the upper card lever contacts UCL, so that the machine again stops with the leading edge of the card insulating the brushes UB from their contact blocks. At this point no entries have been made into the accumulators since the lower card lever contacts LCL through which the accumulator entry circuits pass are still open. Circuits are completed, however, through the upper brushes UB to energize the magnets 17a of the A device. This A device is constructed similarly to a regular accumulator except that it is not provided with tens carry devices and has the usual clutch knockout mechanism which knocks and holds out the entering clutches from the so-called zero time to the commencement of the next cycle. As a result, all wheels of the A device are advanced ten steps or a complete revolution during each of these two preliminary cycles, leaving the wheels standing at zero when the machine stops.

The operator now initiates a third feed cycle as before, this time opening the stop key contacts S immediately after closing the start key contacts so that the contacts UCL (now closed) do not continue the operation. As a result, the machine stops with the first card at brushes LB and the second card at the brushes UB. During this cycle, the day number 1 is read from the first card and entered into the A device.

Switches 66 and 50 are now closed and switch 133 is opened. The operator then closes the reset contacts R to complete a circuit from line 26, motor RM, magnet 51, contacts 52, R, L—2 and 53 to line 27. This initiates a total print and reset cycle of operations. During this cycle of operation no printing or transferring takes place since the accumulators are clear and during which also the closure of contact P10 will cause advance of the brushes of device B to represent 1 thereon. With both the A and B devices representing 1, relay magnets 114 and 115 are energized. The former closes its contacts 114a to enable energization of reset magnet 120 of the A device and the latter closes its contacts 115a to enable contacts P—1 to short circuit reset clutch magnet 51, so that the reset motor RM is deenergized after one cycle of operation. Near the end of the reset cycle when upper contacts P—4 are closed, the motor TM is energized through a circuit from line 26, motor TM, magnet 134, relay magnet 135, switch 66, contacts of the stop key, upper contacts P—4, LCL, P—5 and 53 to line 27. Upon resumption of tabulating the card of the first day will pass the lower brushes and the amount thereon entered into accumulators No. 1 and No. 2. At the same time the date designation of the next card will be entered into device A setting it at 2. During this entering cycle the second card will have passed the upper brushes and the control mechanism sensing the change in day designation will automatically initiate a total printing and reset cycle of operations during which the amount in accumulator No. 1 is printed and the accumulator reset and the total in accumulator No. 2 also printed and transferred into accumulator No. 3.

Early in this cycle cam contact P10 will close to cause advance of device B to represent 2. Since device A is also set at 2 coils 114 and 115 will become energized to close their respective points 114a and 115a. Later in this total printing cycle the closure of contact P1 will complete the reset motor shunting circuit since relay points 115a are closed causing the total printing operation to terminate and, provided the machine is set for automatic restarting, card feeding will resume. During this total printing operation since contact points 114a are also closed closure of cam contacts P11 will energize magnet 120 to effect resetting of device A.

Sensing of the third card by brushes UB will set device A at 3 and the amount on the second card will be entered into accumulators No. 1 and No. 2, following which the group control mechanism will automatically initiate a total printing and reset cycle during which accumulator No. 1 again total prints and clears and accumulator No. 2 prints the amount now standing therein and also transfers the same to accumulator No. 3.

The A setup device is again set to zero and the B device advanced another step to 4. The data on the card of the third day is similarly introduced into the accumulators and total printed in the same manner. As that data is being entered into the accumulators the upper brushes will set the devices A, A1 to represent 17, the date of the next succeeding card at which time the device B is still set at 4. The automatic control mechanism will now initiate a total printing and reset cycle during which the totals are printed and transferred in the now familiar manner. However, since the two setup devices are in disagreement relay points 114a and 115a will be opened, the former preventing the resetting of the A, A1 devices and the latter preventing the completion of the reset motor shunt circuit so that the machine will enter upon a second total print and transfer operation during which the amount standing on accumulator No. 2 will be printed and entered into accumulator No. 3. During this cycle device B will be advanced one step.

The two devices being still in disagreement, another total print and transfer cycle will ensue. These cycles of operation will continue until the two setup devices are in agreement whereupon relay points 114a and 115a will close permitting the restoration of devices A, A1 and the resumption of card feeding operations. In this manner the remaining cards of the group shown in Table I will be tabulated and the results printed. Since the interest period, assuming the problem under consideration, is a thirty day period and since the last transaction was had on the eighteenth day, it is necessary to insert at the end of the group a blank card having perforations representing 30 in the day field. The purpose of this is to set up the A, A1 device at 30 to cause the repeated operation of the transfer mechanism to enter the balance of the account as of the eighteenth day into accumulator No. 3 once for each of the days between the eighteenth and thirtieth. It is assumed for the sake of simplicity of disclosure of the circuits that the operator is in constant attendance at the machine, and is observing the indicating wheels of the A device. Accordingly, when the day number 30 appears, he opens the auto-start switch 66. When the devices B, B1 and A, A1 are again in agreement, the machine will come to rest and accumulator No. 3 will contain an amount shown on Table II as 10367 which is the sum of the daily balances and upon which the interest for the period may be computed. By providing suitable plug connections this amount may be printed on the report sheet, if desired.

For the sake of simplicity, automatic resetting devices for accumulators #2 and #3 are not shown. To reset these accumulators, their reset clutch sleeves 122 (Fig. 3) are engaged and the machine sent through a manual reset cycle during which the accumulators are zeroized. To reset the B devices, repeated manual resets may be effected, during each of which the devices are advanced one step until they reach zero. These devices, however, are in the nature of stepping switches and with access thereto each order may be manually advanced to zero by rocking its armature 108 (Fig. 6) or by rotating its wheel 100a.

The foregoing has presupposed a single card for each day, such cards being so-called summary cards, so that the data on each represents the total of transactions for that day. Where it is desired to feed so-called multiple card groups wherein there are several cards for each day number, this can be done by allotting two day number fields in each card with the related day number punched in one of the fields for all the cards and also in the second field of the first card of the group only. The first field is then plug connected for group controlling and the second is plug connected to the A devices. As a result, the day number of each group is entered only once into the A device when the first card of the day number group passes the upper brushes. The machine is operated just as already explained and as a result, when a group change is sensed, transfer cycles take place in accordance with the setting of the A device, which setting is that of the day number of the next following group.

The foregoing problem has been explained in connection with the preparation of a printed form but the printing, if desired, may be dispensed with and the result obtained without the detailed preparation of the record sheet.

Figure 7:
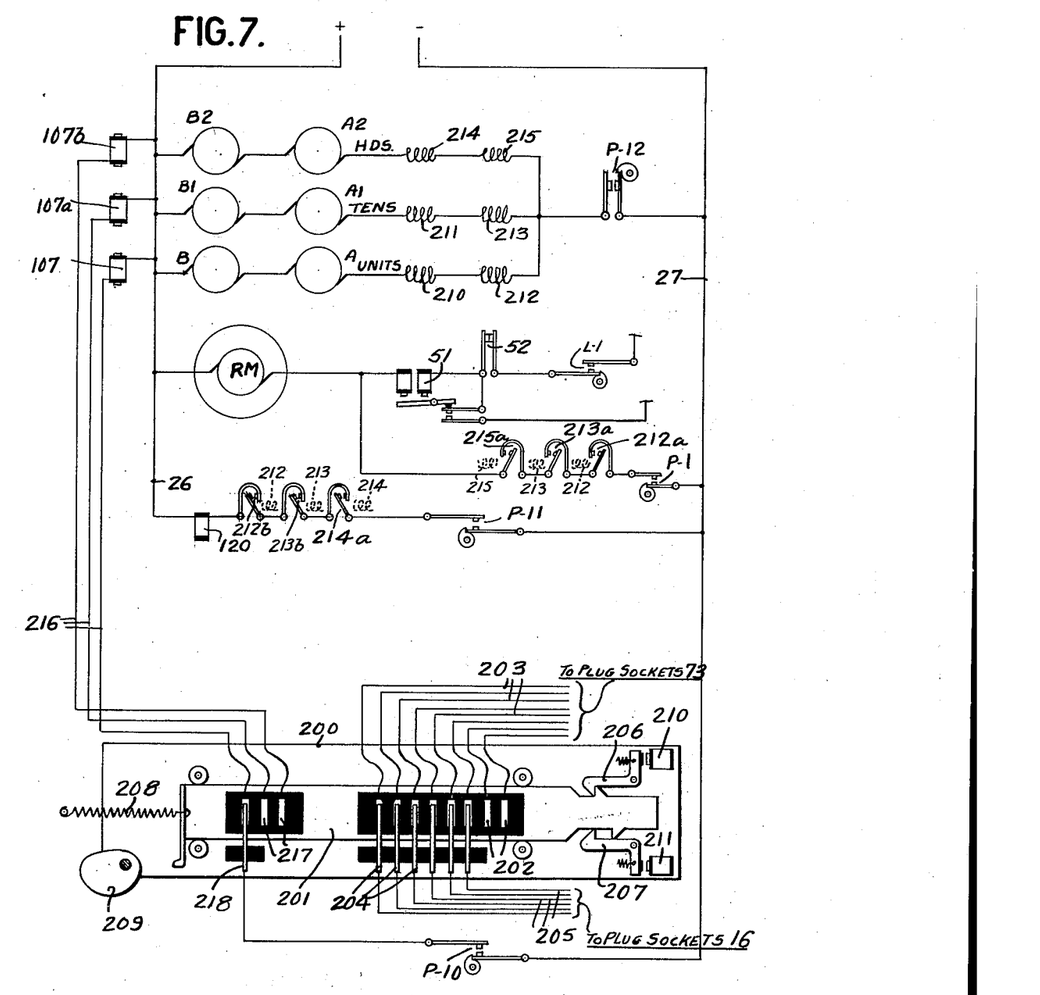
Fig. 7 is a wiring diagram of a modified form of the invention.

In Fig. 7 is shown a modified form of wiring whereby the number of transferring cycles necessary to provide for the inactive days may be considerably lessened. Instead of operating the transfer mechanism for as many cycles as there are missing cards, it will be sufficient to take only as many cycles as are represented by the sum of the denominational orders of the number of missing cards. For instance, where 63 cards are missing, instead of taking 63 transfer cycles with the modified arrangement, 9 will be sufficient, during the first three of which the last previous balance will be entered three times as before.

During the next six the entering connections will be shifted to enter the amount one denominational order higher for each place thus, in effect, entering ten times the number for six successive cycles. This is the well-known system of multiplication by successive addition and use is made of a column shifting or selecting device generally designated 200 in Fig. 7.

The column selecting device comprises a sliding bar 201 provided with a plurality of segments 202 which are connected by wires 203 to the plug sockets 73 of the read-out mechanism of the accumulator from which it is desired to transfer the data. Cooperating with these segments are relatively stationary wipers 204 which may be connected by means of wires 205 to plug sockets 16 of the accumulator to which the data is to be transferred. Slider 201 normally occupies a position as shown in which it is held by a spring-pressed latch 206 against the tension of its actuating spring 208. With the slider 201 in its extreme right hand position, wires 203 will be connected to corresponding denominational order wires 205. Rocking of latch 206 will permit slider 201 to shift one place to the left into cooperation with latch 207 thus connecting wires 203 to the wires 205 representing the next higher position. Release of member 201 by latch 207 will permit the member to shift still another place to the left in which position it will abut the restoring cam 209. Rocking of latches 206 and 207 is controlled by their respective magnets 210, 211.

The day setup devices A, B are set in accordance with the units order, A1, B1 in accordance with the tens order and A2, B2 in accordance with the hundreds order. With the same setting on A and B, a circuit will be completed from line 26 through device B, device A, magnet 210, relay coil 212, contact P12, to line 27. With the same reading on devices A1, B1, magnet 211 and relay coil 213 will be energized and with the same setting on devices A2, B2, relay coils 214 and 215 will be energized.

Each pair of setup devices is provided with a stepping magnet 107, 107a, or 107b which are separately connected by means of wires 216 to segments 217 on the sliding bar 201. For this form of the invention the tens carry devices 117, 118 and related wiring are not required. The segments 217 cooperate in succession with a wiper 218 electrically connected to the cam contact P10. With slider 201 positioned as shown, closure of contact P10 will energize magnet 107. With the slider shifted to its mid position, magnet 107a will receive the impulses, and with the slider in its left-most position, magnet 107b will be connected to the contact P10.

The operation of the device may best be explained in connection with a specific example. Assume for instance, the number 115 to be set on devices B, B1, B2 and the number 289 as having been set on devices A, A1, A2. The difference between these two numbers represents the 174 intervening days for which no transaction cards are present. Assuming the last day's balance, namely that of the 115th day to be 675, the repeated transferring of this amount from one accumulator to the other may be graphically illustrated as follows:

675
675
675
675
6750
6750
6750
6750
6750
6750
6750
67500

Entering this last balance in this fashion will be the equivalent of entering 675 174 times. For each entry of 675 in normal order, magnet 107 will be energized to step device B ahead one place. During the fourth entry, device B will have the same setting as device A and upon closure of cam contact P12, magnet 210 will become energized to release latch 206 permitting slider 201 to assume its intermediate position.

Energization of relay coil 212 will close its points 212a in the reset motor shunt circuit. During the seven subsequent total and transfer cycles the number 6750 will be successively transferred and for each transfer operation magnet 107a will receive an impulse.

When device B1 is in agreement with device A1, magnet 211 will become energized to rock its latch 207 permitting the slider 201 to take its leftmost position and energization of relay 213 will close its points 213a in series with 212a.

The next operation will transfer 67500 during which operation magnet 107b will become energized to bring devices B2 and A2 into agreement. The consequent energization of relay coil 215 will cause closure of its points 215a so that upon the next closure of contact P1 the shunt circuit of the reset motor will be completed and the machine will either stop or resume tabulating in accordance with the setting of the control switches. At the same time closure of points 214a will energize the reset clutch magnet 120 of the A device permitting it to be zeroized. A second pair of relay points 212b and 213b are wired in series with points 214a, so that magnet 120 is not energized until all orders of the B device are set to the positions of their corresponding orders in the A device.

During the first ensuing tabulating cycle, cam 209 will be rotated to restore slider 201 to its initial position. Devices B, B1, B2 may be provided with transfer mechanism of any suitable form either electrical or mechanical to provide for the automatic advance of the higher denominational order device whenever the next lower device passes through zero.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a machine of the class described, accumulators, means for transferring data from one accumulator to another, means for analyzing record cards in succession, means for causing repeated operation of said transferring means, a pair of multidenominational amount receiving devices, each device having a plurality of denominationally ordered elements, entering means for the elements of one of said pair of devices, means controlled by the transferring means to cause said entering means to effect an entry upon each transferring operation, entering means for the elements of the other of said pair of devices controlled by said analyzing means to enter therein a multidenominational number from a record, means for comparing the settings of the elements of the pair of devices and means controlled by said comparing means for interrupting operation of the transferring means when all elements of one device correspond in setting to all elements of the other device.

2. In a machine of the class described, a pair of accumulators, means for transferring data from one accumulator to another, a multidenominational order counting device having tens carry mechanism and settable in accordance with the number of transfer operations performed by the machine, means for analyzing a record card for designations representing a multidenominational number, a denominationally ordered device controlled by said analyzing means to receive all the digits of said number, means for initiating and effecting an uninterrupted succession of operations of said transferring means, means operable during such operations for causing said settable counting device to be advanced one step for each operation, comparing means controlled by the several orders of both the counting device and the receiving device, and means controlled thereby when each order of the counting device has the same setting as the corresponding order of the receiving device for interrupting the operation of said transferring means, whereby the number of operations performed will be equal to the difference between the initial setting of the counting device and the setting of the receiving device.

3. The invention set forth in claim 2 in which resetting means is provided for said number receiving means and further means controlled by said comparing means, operable concurrently with said interrupting means, for rendering the resetting means effective to zeroize the receiving means.

4. The invention set forth in claim 2 in which the comparing means comprises a similar commutator structure for each order of both the settable and receiving devices, and a circuit connection extending serially through all structures when both devices are set to represent the same number.

5. In a machine of the class described, a pair of accumulators, means for transferring data from one accumulator to another, a column shift mechanism included in said transferring means, a denominationally ordered counting device, entering means for each order, a denominationally ordered receiving device, means for entering an amount therein, a separate comparing means between each pair of related orders of the two devices, means for initiating and effecting an uninterrupted succession of operations of said transferring means, means operated with said transferring means for causing the entering means of one order of the counting device to enter a unit for each transferring operation, means for disabling the entering means thereof and rendering effective the entering means of the next order of the counting device, means controlled by the comparing means of said one order, when the same digit is standing in both orders of the related pair, for causing concurrent operation of the last-named means and of said column shift mechanism, and means controlled by all the comparing means when all orders of one device correspond in setting to all orders of the other device for interrupting the operation of the transferring means.

HERMANN ADALBERT WEINLICH.